United States Patent

Panusch et al.

[11] 4,076,580
[45] Feb. 28, 1978

[54] FLAME RETARDANT CELLULOSIC BOARDS

[75] Inventors: Erwin Panusch, Livermore; Igor Sobolev, Orinda; Stephen C. Carniglia, Byron, all of Calif.

[73] Assignee: Kaiser Aluminum & Chemical Corporation, Oakland, Calif.

[21] Appl. No.: 780,725

[22] Filed: Mar. 24, 1977

[51] Int. Cl.² .............................................. D21D 3/00
[52] U.S. Cl. ................................. 162/159; 106/15 FP; 162/181 A; 162/181 B; 264/122; 428/328; 428/329; 428/330; 428/921
[58] Field of Search ............... 162/159, 181 A, 181 B; 106/15 FP; 264/122; 428/326, 328, 329, 330, 403, 921

[56] References Cited

U.S. PATENT DOCUMENTS

| | | | |
|---|---|---|---|
| 1,907,711 | 5/1933 | Becher | 162/159 |
| 3,202,570 | 8/1965 | Videen | 162/159 |
| 3,865,760 | 2/1975 | Pitts et al. | 106/15 FP |
| 3,897,387 | 7/1975 | O'Shaughnessy | 162/159 |
| 4,032,393 | 6/1977 | Alfeis et al. | 162/159 |

Primary Examiner—Richard V. Fisher
Assistant Examiner—Peter Chin
Attorney, Agent, or Firm—Paul E. Calrow; Andrew E. Barlay

[57] ABSTRACT

Cellulosic boards, such as hardboards, fiberboards and particle-boards, are flame retarded by incorporation of a synergistically acting alumina trihydrate-ulexite composition in the boards. The alumina trihydrate-ulexite flame-retarding agent provides a board of satisfactory strength properties with a flame spread at least equivalent to that of a commercial Class I-rated hardboard when the loading of the flame-retarding agent in the board is kept at 50% or below of the total weight of the flame-retarded board.

11 Claims, 2 Drawing Figures

EFFECT OF LOADING LEVELS ON FLAMMABILITY OF HARDBOARD

EFFECT OF LOADING LEVELS ON FLAMMABILITY OF HARDBOARD

EFFECT OF HYDRATE-ULEXITE COMPOSITION ON FLAMMABILITY OF HARDBOARD

4,076,580

FLAME RETARDANT CELLULOSIC BOARDS

BACKGROUND OF THE INVENTION

Increasing concern for the flame retardancy of residential and commercial construction elements has spurred considerable development activity in the recent past. Thus, important steps have been taken to render plastic building components flame retardant and the work has also been extended to include cellulosic materials employed for construction purposes. As a result of the work performed, the patent literature is replete with numerous processes for the flame proofing of cellulosic boards, such as hardboards, fiberboards and/or particle-boards. To achieve the desired flame retardance in these materials, the prior art recommends incorporation of various inorganic and organic flameproofing agents and also combinations of these in the boards. For example, as early as 1933, U.S. Pat. No. 1,907,711 (Becher) recommended the addition of alumina hydrate [$Al(OH)_3$] as fireproofing agent to boards made from cellulosic materials, such as wood pulp. The incorporation of alumina hydrate in the wood pulp resulted in boards which exhibited a high degree of fire resistance and possessed reduced afterglow characteristics.

Prior art attempts to further improve the fire retardance of cellulosic boards included the addition of boron-containing compounds to cellulosic boards, for example, U.S. Pat. No. 2,611,694 (Becher) mentions the addition of borax to cellulosic boards. Incorporation of a boric acid-borax mixture in laminated wood to impart flame retardancy has been reported in a recent Canadian patent (U.S. Pat. No. 971,049 — Perlus et al). Addition of such highly water-soluble boron salts as flame-retarding agents to cellulosic boards involves leachability problems, particularly when the boards are exposed to rain or moisture of condensation, which can cause gradual reduction in the flame retardancy of these boards. The pertinent prior art also includes U.S. Pat. No. 3,865,760 to Pitts et al (1975), where a plastic composition, particularly a foamed or solid rubber product, is rendered flame retardant by incorporation of a hydrated, boron-containing material of reduced water-solubility, such as colemanite ($Ca_2B_6O_{11} \cdot 5H_2O$) or ulexite ($NaCaB_5O_9 \cdot 8H_2O$). The boron-containing agent, as mentioned in this patent, can be used either alone or in combination with other flame retardants, for example, hydrated alumina. This reference indicates that colemanite, when added in a 1.5:1 weight ratio to rubber, was capable of increasing the oxygen index of the mixture to about 29, while alumina trihydrate, when incorporated without colemanite, also in a 1.5:1 weight ratio of $Al(OH)_3$ to rubber, provided an oxygen index of 30. A 1:1 mixture by weight of colemanite and $Al(OH)_3$, when used to flame-retard a rubber composition in a colemanite-alumina trihydrate: rubber weight ratio of 1.5:1, resulted in an oxygen index of 31, which is only slightly higher than the value attained with colemanite alone, or with colemanite-free alumina hydrate.

Thus, use of a mixture of the hydrated boron-containing mineral with alumina hydrate, did not significantly improve the flame retardancy of the rubber composition over the results obtained with the individual components of the flame-retarding mixture and at best provided only an economic advantage in employing, for example, a less expensive component in the flame-retarding agent.

The results obtained with flame-retardant rubber compositions with either colemanite, ulexite or alumina hydrate, or with mixtures of these, when applied to plastics, such as rubber, may provide overall satisfactory results. However, when either the individual components or the mixtures of the individual components are incorporated in cellulosic boards, such as hardboards or particle-boards, in amounts and ratios described in the above-referred to Pitts et al reference, a cellulosic board is obtained which while exhibiting suitable flame retardance, although high afterglow, lacks important physical strength properties required from these boards. This is mainly due to the large quantity of flame-retarding agent prescribed by the Pitts et al reference. On the other hand, when reduced quantities of such flame-retarding compositions are added to plastic compositions, they fail to impart the necessary flame retardancy to these compositions, demonstrating the requirement for high flame-retarding agent loading in order to obtain the desired results.

It has now been surprisingly discovered that when a mixture of ulexite and alumina trihydrate is incorporated in cellulosic boards in controlled quantities, which are significantly lower than those referred to in the prior art, boards of excellent flame retardancy and satisfactory physical properties can be obtained. The ulexite-alumina trihydrate flame-retarded boards made by the present discovery are free of afterglow, meet presently defined Class I fire ratings and, in addition, satisfy all physical strength requirements set forth by existing standards. The unobvious and surprising nature of the present invention becomes even more pronounced when it is considered that neither ulexite, nor alumina trihydrate alone, is capable of producing the same flame-retarding effect in cellulosic boards, as the mixture of these at the same loading. This fact clearly indicates the unexpected synergistic effect of ulexite-alumina trihydrate mixtures on the flame retardancy of cellulosic boards.

BRIEF SUMMARY OF THE INVENTION

A synergistically performing flame-retarding composition containing alumina hydrate and ulexite is provided for cellulosic boards. The flame-retarding composition contains about 30–70% by weight, preferably about 50–70% by weight, alumina hydrate, the remainder ulexite. This mixture is incorporated in the board in an amount corresponding to about 30–50% of the total weight of the flame-retarded board. For hardboards of about 0.63 cm (¼ inch) thickness, the quantity of flame-retarding composition is selected to be within the range of about 35–50% by weight of the total weight of the flame-retarded board. The composition is suitable for imparting flame-retardancy to boards, such as hardboards or particle-boards.

DETAILED DESCRIPTION OF THE INVENTION

Figure 1:
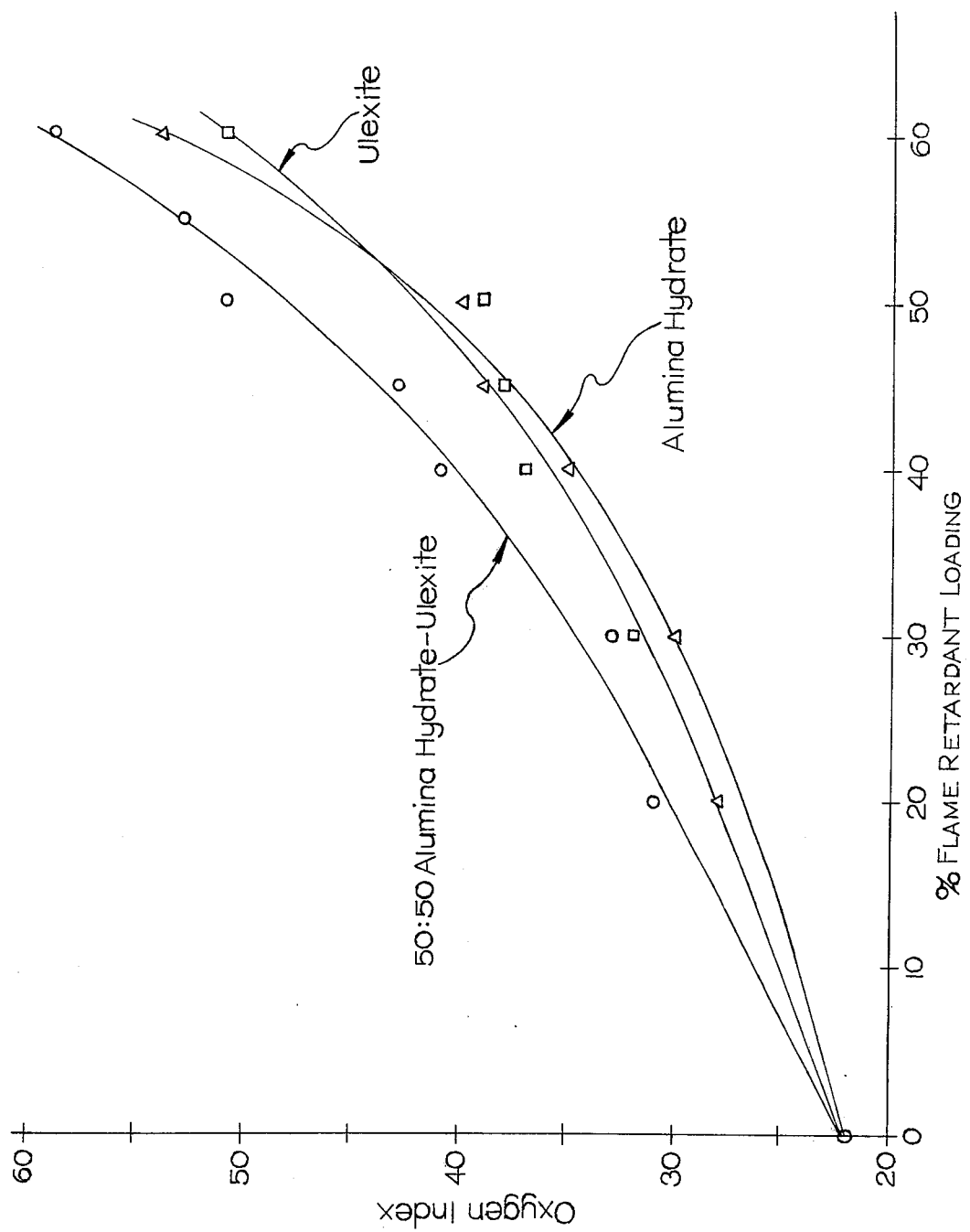
FIG. 1 graphically denotes the flame-retarding effect of alumina trihydrate, ulexite, and a ulexite-alumina trihydrate mixture on cellulosic boards at various loadings in the board.

The present invention relates to the flame retarding of cellulosic boards by incorporation of a synergistically acting ulexite-alumina trihydrate flame-retarding composition in the boards.

For the purposes of the invention, the term "cellulosic board" encompasses hardboards and particle-boards which are made from cellulosic materials, such as wood fibers, sawdust, wood particles, bagasse and other fibrous plant residues.

The expressions "alumina trihydrate", "alumina hydrate" and "hydrated alumina" all refer to an alumina compound generally defined by the formulas of $Al_2O_3 \cdot 3H_2O$ or $Al(OH)_3$.

The hydrated, boron-containing mineral ulexite, employed by the instant invention as one of the essential components of the synergistically performing flame-retarding agent, is naturally occurring and has the generally accepted formula of $NaCaB_5O_9 \cdot 8H_2O$, sometimes also defined as $Na_2O \cdot 2CaO \cdot 5B_2O_3 \cdot 16H_2O$. This mineral is only slightly soluble in water and is readily found in large deposits, for example, in Nevada and California.

Flame spread measurements reported in the present application were carried out with an inclined 2-foot (0.61 meter) tunnel substantially equivalent to the tunnel described by Levy in the Journal of Cellular Plastics, pp. 168-173 (April 1967). In this article, evidence is presented for a correlation between results obtained with this tunnel and the 25-foot (7.62 m) tunnel of the ASTM E 84-76a method employed to define Class I fire ratings of building materials.

Oxygen indices given in the instant application were measured by the ASTM D 2863-70 method.

The flame retarding composition of the present invention is an essentially uniform mixture of ulexite and alumina trihydrate particles. The mixture, to be efficient as a synergistically performing flame-retarding agent, generally contains from about 30% to about 70% by weight ulexite, with the balance being alumina trihydrate. For optimum flame-retarding characteristics, mixtures containing from about 30% to about 50% by weight ulexite, with the balance being alumina trihydrate, are employed.

Concerning the particle size of the ulexite-alumina trihydrate mixture, it has been found that satisfactory results can be obtained when the average particle size of the mixture is kept within the range of about 5 to 275 microns (0.005-0.275 mm) and preferably within the range of about 7 to 200 microns (0.007-0.200 mm). Smaller average particle sizes can result in flame retardant composition losses during the manufacture of the cellulosic boards, for example, by dusting, with attendant loss of flame retardancy of the board. Average particle sizes larger than about 275 microns may interfere with the uniform distribution of the flame-retarding composition in the boards and may also cause surface imperfections in finished boards.

The quantity of flame-retarding composition to be incorporated in the cellulosic boards is generally established at about 50% or less; in other words, the weight ratio of ulexite-alumina trihydrate mixture to total cellulosic material used for making the board is 1:1 or less. A flame spread corresponding to Class I fire rating for ulexite-alumina trihydrate flame-retarded hardboard of about ¼ inch (0.63 cm) thickness can be readily achieved in boards containing about 35-50% by weight (calculated on the total weight of the cellulosic material) flame-retarding composition. In hardboard of greater thickness and in particle-boards, required concentrations vary depending on thickness. In hardboard of ¼ inch or more thickness, less than about 30% of the flame-retardant composition will not provide adequate flame retardancy for Class I rating, while quantities much in excess of about 50% by weight impart undesirable physical properties to the finished board, including significant reduction in strength. In particle-board of ½ inch (1.27 cm) thickness, the required ulexite-alumina hydrate concentration is between about 30-50% by weight (based on the total weight of the board) to achieve flame spread equivalent to Class I fire rating.

It is to be understood that while the discussion in the instant specification centers on the incorporation of a ulexite-alumina trihydrate mixture or composition in the cellulosic boards, the concept of the present invention equally includes the addition of the individual components to the cellulosic board-forming materials. This can occur at different stages during processing of the boards, although the weight ratios of the individual components relative to each other, even when added separately during the board manufacturing steps, are kept within the limits defined previously. In other words, flame retarding of the cellulosic boards can proceed by at first incorporating alumina trihydrate, followed by incorporation of the ulexite component of the mixture at a later stage. Naturally, the sequence of addition can be reversed, for example, by adding the ulexite first, followed by addition of the alumina trihydrate. In order to maintain the effectiveness of the synergistically acting ulexite-alumina trihydrate flame-retarding composition, when the constituents of the mixture are added separately, care is to be taken to assure uniform distribution of the constituents within the board-forming material.

Incorporation of the ulexite-alumina trihydrate composition in the cellulosic board, whether as a mixture or by sequential addition of the individual constituents, can be accomplished in several ways depending on the type of board to be made and also on the type of manufacturing procedure selected. These manufacturing procedures, while possibly varying from plant to plant in various degrees, can be, however, defined in two major categories, e.g., the "dry" method and the "wet" method. Both of these processes have been extensively treated in the published prior art, for example, the "wet" method has been described in great detail in U.S. Pat. No. 3,966,540 (Selander et al), while the "dry" process has been shown in U.S. Pat. No. 3,873,662 (Cartlidge et al) for the manufacture of particle-boards. The latter method is equally suitable for the preparation of fibrous boards with only minor variations in processing conditions. Whether the "dry" or the "wet" method is utilized for the manufacture of the flame-retarded cellulosic board, for optimum flame retardancy, care has to be taken to obtain uniform distribution of the flame-retarding composition within the board-forming materials, such as fibers or particles. This can be attained either by mechanical means, for example, by agitation, or by careful selection of such processing steps which allow the thorough mixing of the flame-retarding constituents with the cellulosic materials, or by employing the combination of these.

In the "dry" process of forming hardboard, for example, uniform distribution of flame-retarding agent is enhanced by using fibers with a moisture content in the range of about 20-40% of the weight of the cellulosic material.

The following examples demonstrate the outstanding flame-retarding properties obtainable by use of the synergistically acting, afterglow-free ulexite-alumina trihydrate composition.

EXAMPLE I

A series of flame-retarded hardboards was made from dry unbleached wood fibers by incorporating varying quantities of ulexite-alumina hydrate compositions in each individual board. All boards of the series were made according to the process described below with the exception of the ulexite-alumina hydrate quantity which was changed from board to board. For each board, 260 grams of fluffed fiber were charged into a container of 19 liter (5 gallons) capacity. The container was closed, then tumbled at an angle, while through an aperture, an aqueous binder composition, containing 27 grams of phenol-formaldehyde resin dispersed in 130 ml water, was introduced. Subsequently, the ulexite-alumina hydrate composition, containing a 50:50 mixture (by weight) of these components, was incorporated in the fibers under vigorous mixing. The mixture was then transferred to a sheet mold of 25.4 × 25.4 cm (10 inches × 10 inches) size and compacted with a metal plate. The fiber mat was further compacted in a platen press without employing heat, then the compacted mat was transferred to a perforated aluminum plate on which it was pressed into a board. For board making a temperature of 215° C (419° F) was used with an initial force of about 19 tons (380 psi) for 1.5 minutes. This was followed by an approximately 4-minute pressure treatment at 7.5 tons (140 psi) at the same temperature. The finished board was stored for about 12-14 hours, then specimens of about 8 × 25 cm (3¼ × 10 inches) were cut for flame-retardancy testing.

To establish the effect of loading of the alumina hydrate-ulexite composition on flame-retardancy, the loading in this series of board was varied between 0 and 60%, based on the total weight of the cellulose-ulexite-alumina hydrate composition in the finished flame-retarded board. The flame-retardancy of these boards, expressed in flame spread and also in oxygen index, is shown in Table I and graphically depicted in FIG. 1.

Table I

| Flame retardance of hardboards containing ulexite-alumina hydrate compositions | | |
|---|---|---|
| Loading[1] in Wt.%[2] | Flame Spread[3][4] inches | Oxygen Index[5] |
| 0 | >18 | 22 |
| 20 | >18 | 31 |
| 30 | >18 | 33 |
| 40 | 15 | 41 |
| 45 | 14.5 | 43 |
| 50 | 14.0 | 51 |
| 55 | 13.5[6] | 53 |
| 60 | 13.0[6] | 59 |

[1]50:50 by weight mixture of ulexite-alumina hydrate
[2]Percent by weight based on total weight of finished board
[3]Measured according to Levy, Journal of Cellular Plastics pp. 168-173 (April 1967)
[4]No afterglow observed from flame spread test
[5]Measured by ASTM D 2863-70
[6]Unsatisfactory physical properties

EXAMPLE II

Another series of hardboards was prepared according to the process described in Example I. In this series, the flame-retarding effect of the individual components of the novel, synergistic mixture was tested. Thus, boards were made containing only alumina hydrate at loadings between 0 and 60% by weight based on the total weight of the board and the tests were repeated using only ulexite at the same 0-60% by weight loading. All the board test specimen were subjected to flame spread and oxygen index measurements and the results are reported in Table II, as well as graphically shown in FIG. 1.

Table II

| Flame retardance imparted to hardboards by alumina hydrate or ulexite at various loadings | | | | | |
|---|---|---|---|---|---|
| | Alumina hydrate | | Ulexite | | |
| Loading in Wt.% | Flame Spread inches | Oxygen Index | Flame Spread inches | Oxygen Index | Afterglow[1] |
| 0 | — | — | — | — | — |
| 20 | >18 | 28 | >18 | 32 | — |
| 30 | >18 | 30 | >18 | 32 | + |
| 40 | 17 | 35 | 15.5 | 37 | + |
| 45 | 16 | 39 | 16 | 38 | + |
| 50 | 15 | 40 | 14.5 | 39 | + |
| 55 | — | — | — | — | — |
| 60[2] | 13.5 | 54 | 14 | 51 | + |

[1]+ indicates afterglow observed after flame spread testing of ulexite-containing boards
— indicates no afterglow
[2]Boards exhibited undesirable physical characteristics From the results tabulated in Examples I and II, the synergistic flame-retarding effect attained by the use of a ulexite-alumina hydrate composition can be clearly observed. Moreover, nearly all of the ulexite containing boards exhibited afterglow.

EXAMPLE III

Figure 2:
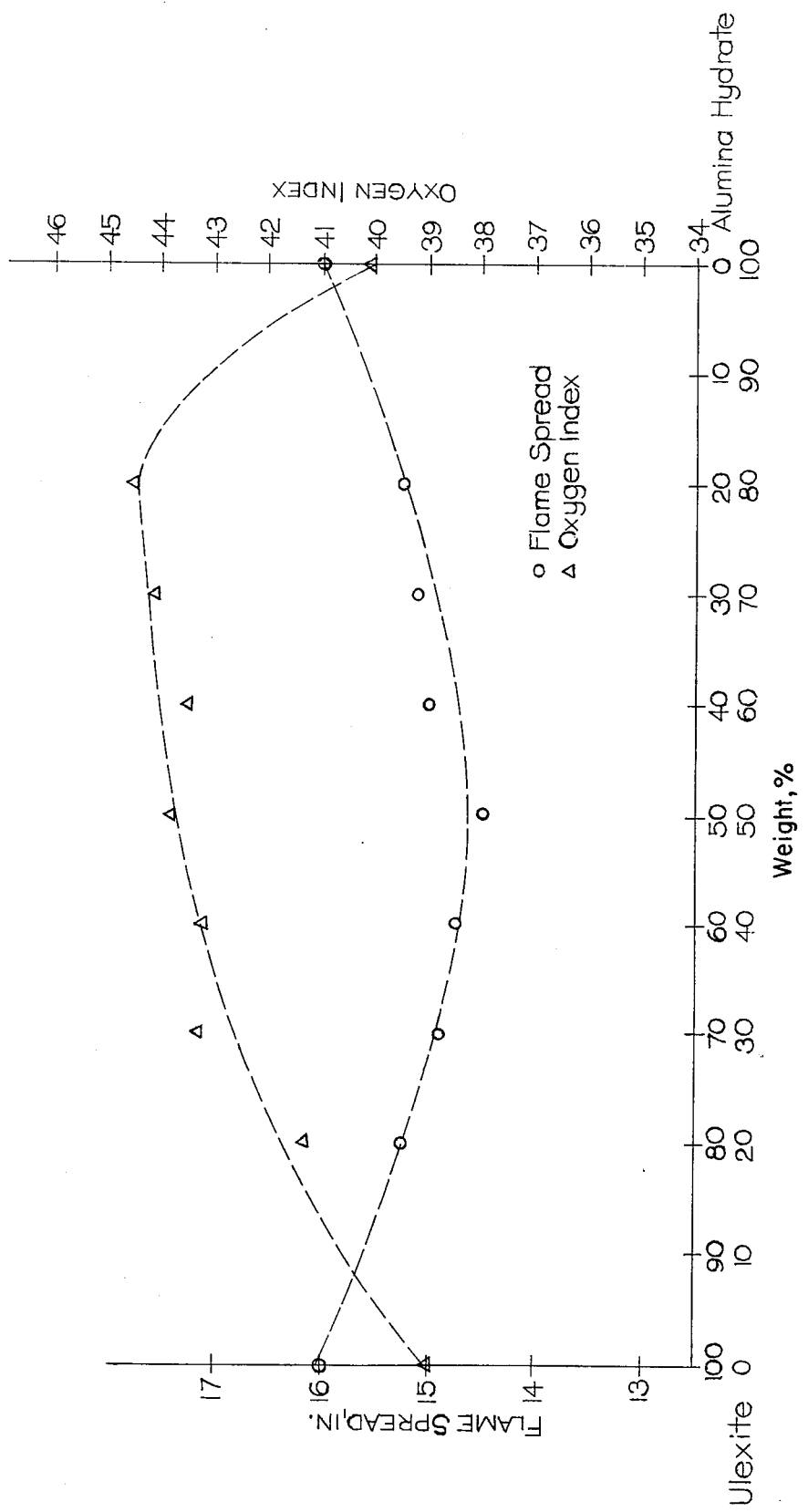
FIG. 2 shows the relationship of flame spread and oxygen index to varying ulexite to alumina trihydrate ratios at a 45% loading based on the total weight of the board.

Tests were also conducted to determine the optimum ulexite-alumina hydrate composition weight ratio, at a constant loading which was selected to be 45% by weight based on the total weight of the finished board. This loading was found to be the most desirable in relationship to the physical properties, such as tensile strength, of the flame-retarded board and also the flame retardancy imparted by this quantity of ulexite-alumina hydrate composition. All boards were made by the process shown in Example I with the exception that the alumina hydrate content of the flame-retardant composition was varied between 0 and 100%. The flame retardant properties of these boards are described in Table III and also graphically shown in FIG. 2.

Table III

| Flame retardant properties of hardboards containing ulexite-alumina hydrate flame-retarding composition | | | | |
|---|---|---|---|---|
| Composition in %[1] | | Flammability Characteristics | | |
| Alumina Hydrate | Ulexite | Flame Spread inches | Oxygen Index | Afterglow[2] |
| 100 | — | 16.0 | 39.0 | + |
| 80 | 20 | 15.3 | 41.3 | + |
| 70 | 30 | 14.9 | 43.2 | — |
| 60 | 40 | 14.8 | 43.2 | — |
| 50 | 50 | 14.5 | 43.8 | — |
| 40 | 60 | 15.0 | 43.5 | + |
| 30 | 70 | 15.1 | 44.1 | — |
| 20 | 80 | 15.3 | 44.5 | + |
| 0 | 100 | 16.0 | 40.1 | + |

[1]Constant loading of flame retardant at 45% by weight of the total weight of the board
[2]+ = afterglow observed after test
— = no afterglow It can be observed that at the constant loading of 45% by weight of the total weight of the ¼ inch board, optimum flame-retarding results can be achieved when the alumina hydrate to ulexite weight ratio is kept in the range of about 30-70% and within this range, the 50-70% alumina hydrate content is preferred.

EXAMPLE IV

In addition to flame-retardant hardboards, the synergistically performing ulexite-alumina hydrate composition was also used to flame retard particle-boards. Thus, 415 grams of furnish (wood chips) was sprayed, while being tumbled in the container of Example I, with a binder composition containing 132 grams of ureaformaldehyde resin containing 50% solids dispersed in 100 ml water. After air-drying of the composite for 12-14 hours, the composite was screened through a screen having openings of about 0.50 mm (0.0195 inch). The fines (<0.5 mm size), amounting to 230 grams, were divided into two equal portions and each portion was thoroughly mixed with 78.7 grams of alumin hydrate-ulexite composition, having an alumina hydrate to ulexite weight ratio of 1:1. The coarse fraction (268 grams) was combined with 182 grams of alumina hydrate-ulexite composition. One portion of the flame-retarded fines was then distributed evenly in a sheet metal frame of 25.4 × 25.4 cm size and about 7 cm height, followed by uniformly spreading the flame-retarded coarse fraction on the top of the fines. Finally, the second portion of fines was distributed evenly on the top of the coarse fraction. On top of this composite a preheated (149° C) aluminum plate was placed. Then the entire assembly was placed into a platen press where an initial pressure of 28.12 kg/cm$^2$ (400 lbs/sq.in.) was applied for 2 minutes at a platen temperature of 149° C, followed by a final pressure of 14.06 kg/cm$^2$ (200 lbs/sq.in.) for 9 minutes at the same temperature. The finished board was allowed to stand for 12-14 hours, then specimen were cut for flame retardance testing. The specimens tested met the flame spread requirement set for Class I boards.

Hardboards were also made using the "wet" method of preparation which involved the addition of the alumina hydrate-ulexite flame retardant to a slurry of wood fibers. The boards produced in this manner also exhibited the excellent flame-retardancy imparted by the synergistic composition of the instant invention.

Although the invention has been described in detail, it is not limited to the specific embodiments shown but may be varied in many respects within the scope of the basic concept thereof.

What is claimed is:

1. A process for producing flame-retardant cellulosic board which comprises incorporating in the board furnish a synergistically acting flame-retarding composition consisting of alumina hydrate and ulexite, wherein the quantity of alumina hydrate in the composition is maintained within the range of about 30-70% by weight of the composition and wherein this composition is incorporated in the board in an amount corresponding to about 30-50% by weight of the total weight of the flame-retarded board and forming the flame-retarded board.

2. Process according to claim 1, wherein the quantity of alumina hydrate in the flame retarding composition is maintained within the range of about 50 to about 70% by weight.

3. Process according to claim 1, wherein the cellulosic board has a thickness of about 0.63 cm (¼ inch) and the amount of flame-retarding composition in the cellulosic board corresponds to about 35 to 50% by weight of the flame-retarded board.

4. Process according to claim 1, wherein the cellulosic board is a hardboard.

5. Process according to claim 1, wherein the cellulosic board is a particle-board.

6. Process according to claim 1, wherein the cellulosic board is a fiberboard.

7. A flame-retarded cellulosic board containing a synergistically performing alumina hydrate-ulexite flame-retarding composition, wherein the amount of alumina hydrate in the composition is kept within the range of about 30 to about 70% by weight and the quantity of flame-retarding composition in the flame-retarded board is maintained within the range of about 30 to about 50% by weight based on the total weight of the flame-retarded board.

8. Article of claim 7, wherein the amount of alumina hydrate in the flame-retarding composition is kept within the range of about 50 to about 70% by weight.

9. Article of claim 7, wherein the cellulosic board is a hardboard.

10. Article of claim 7, wherein the cellulosic board is a particle-board.

11. Article of claim 7, wherein the cellulosic board is a fiberboard.

* * * * *